(12) United States Patent
Suzuki (10) Patent No.: US 12,130,494 B2
(45) Date of Patent: Oct. 29, 2024

(54) LENS BARREL AND IMAGING DEVICE

(71) Applicant: Yohsuke Suzuki, Kanagawa (JP)

(72) Inventor: Yohsuke Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 477 days.

(21) Appl. No.: 17/428,277

(22) PCT Filed: Jan. 23, 2020

(86) PCT No.: PCT/JP2020/002430
§ 371 (c)(1),
(2) Date: Aug. 4, 2021

(87) PCT Pub. No.: WO2020/174958
PCT Pub. Date: Sep. 3, 2020

(65) Prior Publication Data
US 2022/0128791 A1 Apr. 28, 2022

(30) Foreign Application Priority Data
Feb. 27, 2019 (JP) .................................. 2019-033994

(51) Int. Cl.
*G02B 7/10* (2021.01)
*G02B 15/22* (2006.01)
*H04N 23/55* (2023.01)

(52) U.S. Cl.
CPC .............. *G02B 7/10* (2013.01); *G02B 15/22* (2013.01); *H04N 23/55* (2023.01)

(58) Field of Classification Search
CPC . G02B 7/08; G02B 7/10; G02B 15/22; G03B 3/10; H04N 23/55
See application file for complete search history.

(56) References Cited

U.S. PATENT DOCUMENTS

| 5,850,577 A | 12/1998 | Ito |
| 2007/0116451 A1 | 5/2007 | Yamamoto et al. |
| 2011/0157456 A1 | 6/2011 | Hongu |

(Continued)

FOREIGN PATENT DOCUMENTS

| CN | 101620311 A | 1/2010 |
| CN | 102111551 A | 6/2011 |

(Continued)

OTHER PUBLICATIONS

International Search Report issued on Apr. 7, 2020 in PCT/JP2020/002430 filed on Jan. 23, 2020, 8 pages.

(Continued)

*Primary Examiner* — Jack Dinh
(74) *Attorney, Agent, or Firm* — XSENSUS LLP (57) ABSTRACT

A lens barrel includes a plurality of lens groups; a driver configured to move at least part of the plurality of lens groups along an optical axis for focusing; a holder configured to hold the plurality of lens groups and the driver; and a mover configured to move the plurality of lens groups and the driver together along the optical axis by moving the holder along the optical axis. The mover moves the holder to at least a first position at which a shooting distance of the lens barrel is changeable within a first range, and a second position at which the shooting distance of the lens barrel is changeable within a second range. The second range is shorter in minimum shooting distance than the first range.

20 Claims, 9 Drawing Sheets

(56) References Cited

U.S. PATENT DOCUMENTS

| | | |
|---|---|---|
| 2014/0009652 A1 | 1/2014 | Sugita |
| 2014/0009668 A1 | 1/2014 | Sugita |
| 2014/0347753 A1 | 11/2014 | Terahara et al. |
| 2016/0041365 A1 | 2/2016 | Ikeo et al. |
| 2017/0336592 A1 | 11/2017 | Terahara et al. |
| 2020/0033550 A1 | 1/2020 | Terahara et al. |

FOREIGN PATENT DOCUMENTS

| | | |
|---|---|---|
| CN | 103543522 A | 1/2014 |
| CN | 103543523 A | 1/2014 |
| DE | 602006001504 | 7/2008 |
| JP | 02-287333 | 11/1990 |
| JP | H06-67077 A | 3/1994 |
| JP | 09-269446 | 10/1997 |
| JP | 3253360 | 2/2002 |
| JP | 2005-202064 | 7/2005 |
| JP | 2012-123340 | 6/2012 |
| JP | 2014-228713 | 12/2014 |

OTHER PUBLICATIONS

Office Action issued Dec. 27, 2022 in Japanese Patent Application No. 2019-033994, 4 pages.
Office Action issued Oct. 26, 2022 in Chinese Patent Application No. 202080016976.1, 13 pages.

ns Barrel and imaging device

CROSS-REFERENCE TO RELATED APPLICATIONS

The present application is based on PCT filing PCT/JP2020/002430, filed Jan. 23, 2020, which claims priority to JP 2019-033994, filed Feb. 27, 2019, the entire contents of each are incorporated herein by reference.

TECHNICAL FIELD

The present invention relates to a lens barrel and an imaging device.

BACKGROUND ART

Conventionally, to further shorten the minimum shooting distance of an imaging device, for example, an additional lens is inserted into an imaging lens, a macro conversion lens is attached to an imaging lens, or an extension tube is attached to a mount.

Inserting another lens into an imaging lens may lead to complexing the mechanism around the lenses and changing a positional relationship among the lens groups of the imaging lens. This makes it difficult to maintain the intrinsic optical performance of the imaging lens. As for addition of a macro conversion lens or an extension tube, these elements are to be attached or removed manually, which may be troublesome for the user.

Patent Literature 1, for example, describes a lens barrel with a collapsible cam dedicated for a macro shooting mode, which protrudes all the lens groups to shorten the minimum shooting distance of an imaging device from that in a normal shooting mode.

The lens barrel in Patent Literature 1 can exclude an additional lens to be inserted into an imaging lens and or a macro conversion lens or an extension tube to attach, to shorten the minimum shooting distance of the imaging device from that in the normal shooting mode.

CITATION LIST

Patent Literature

PTL 1: Japanese Patent No. 3253360

SUMMARY OF INVENTION

Technical Problem

It is an object of the present invention to provide a lens barrel and an imaging device that can prevent deterioration in the optical performance of an imaging lens in a minimum shooting distance shorter than a typical shooting distance.

Solution to Problem

According to an embodiment of the present invention, a lens barrel includes a plurality of lens groups; a driver configured to move at least part of the plurality of lens groups along an optical axis for focusing; a holder configured to hold the plurality of lens groups and the driver; and a mover configured to move the plurality of lens groups and the driver together along the optical axis by moving the holder along the optical axis. The mover moves the holder to at least a first position at which a shooting distance of the lens barrel is changeable within a first range, and a second position at which the shooting distance of the lens barrel is changeable within a second range. The second range is shorter in minimum shooting distance than the first range.

Advantageous Effects of Invention

According to an aspect of the present invention, it is possible to provide the lens barrel and the imaging device that can prevent deterioration in the optical performance of the imaging lens in the minimum shooting distance shorter than a typical minimum shooting distance.

DESCRIPTION OF EMBODIMENTS

Hereinafter, a lens barrel according to an embodiment and an imaging device including such a lens barrel will be described below with reference to the accompanying drawings.

Figure 1:
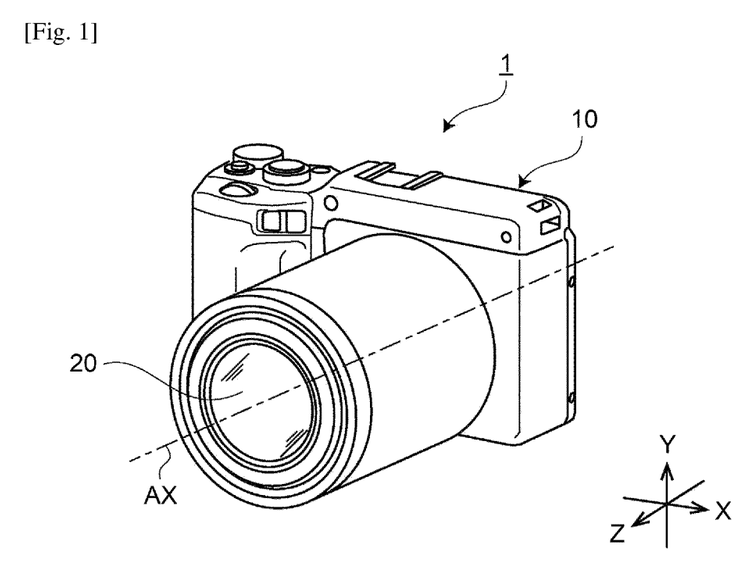
FIG. 1 is a perspective view schematically illustrating an imaging device according to an embodiment of the present invention.
Figure 2:
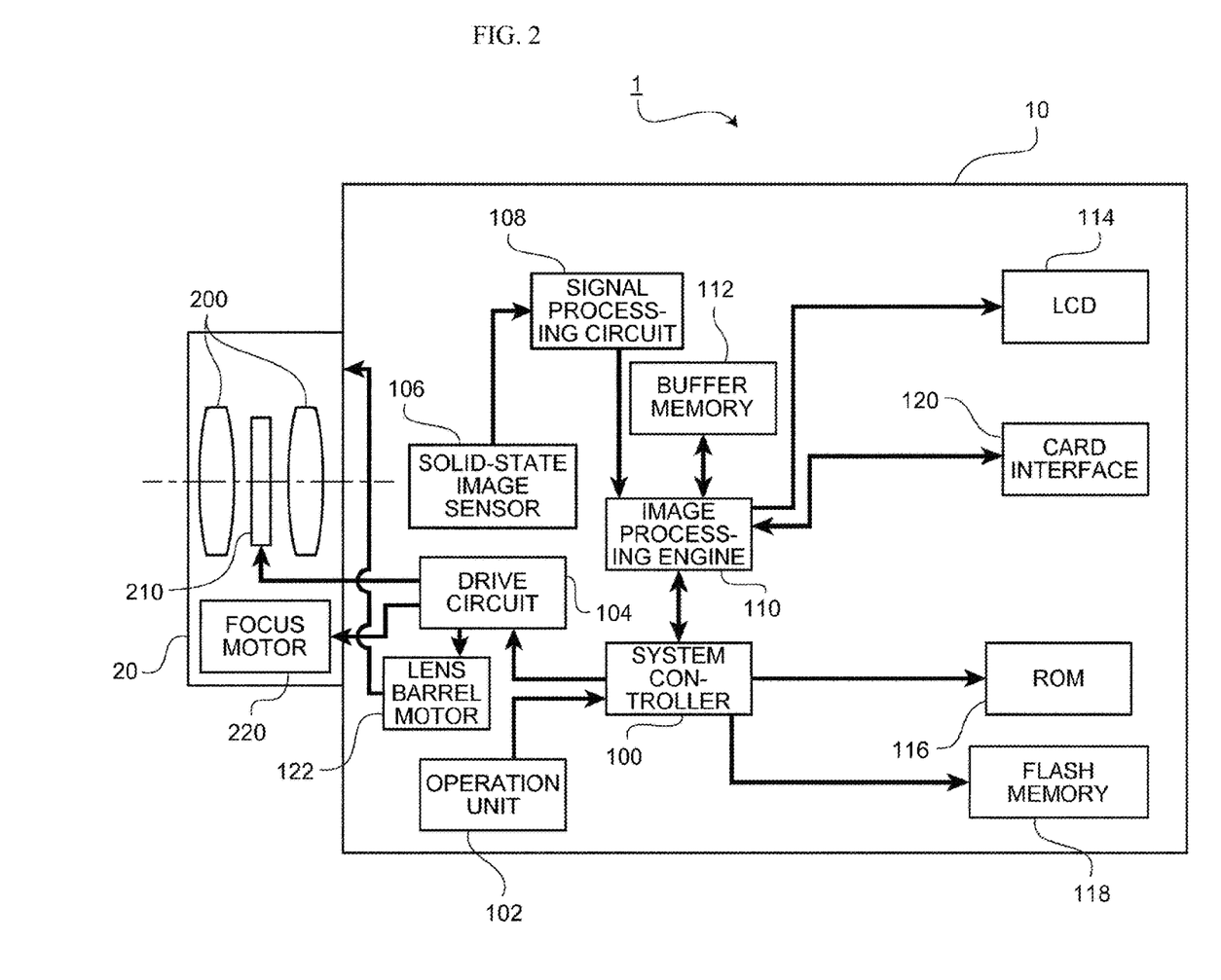
FIG. 2 is a block diagram illustrating a configuration of the imaging device according to the embodiment.

FIG. 1 is a schematic perspective view illustrating an imaging device 1 according to an embodiment. FIG. 2 is a block diagram illustrating a structure of the imaging device 1. The imaging device includes a photographic function of a single-lens reflex camera, a compact digital camera, a mirrorless single-lens camera, a video camera, or a camcorder, for example.

As illustrated in FIGS. 1 and 2, the imaging device 1 includes a device body 10 and a lens barrel 20. The device body 10 operates as a drive unit that applies driving force to the lens barrel 20 and controls the operation of the lens barrel 20.

The device body 10 includes a system controller 100, an operation unit 102, a drive circuit 104, a solid-state image sensor 106, a signal processing circuit 108, an image processing engine 110, a buffer memory 112, a liquid crystal display (LCD) 114, a read only memory (ROM) 116, a flash memory 118, a card interface 120, and a lens barrel motor 122.

The lens barrel 20 includes an imaging lens 200, a shutter unit 210, and a focus motor 220.

In the following, three directions are defined. Z-axis direction is defined to be along the optical axis of the imaging lens 200 or along an optical axis AX, a Y-axis direction is defined to be a vertical direction orthogonal to the Z-axis direction in FIG. 1, and an X-axis direction is defined to be a horizontal direction orthogonal to the Y-axis direction and the Z-axis direction in FIG. 1.

The operation unit 102 includes various buttons and dials for the user to operate the imaging device 1, such as a power button, a release button, and a shooting mode button. In response to a user's operation to the power button, the respective circuits of the imaging device 1 are supplied with power from a battery (not illustrated) through a power-supply line.

The system controller 100 includes a central processing unit (CPU) and a digital signal processor (DSP). After the power supply, the system controller 100 accesses the ROM 116 to retrieve and load a control program into a work area (not illustrated). The system controller 100 executes the loaded control program to control the entire imaging device 1.

In response to a user's manipulation of the release button, for example, the system controller 100 controls via the drive circuit 104 the shutter unit 210 to operate for correct exposure based on a photometric value, calculated from an image generated by the solid-state image sensor 106, or based on a photometric value measured by an exposure meter (not illustrated) incorporated in the imaging device 1.

More specifically, the shutter unit 210 is driven according to an automatic exposure (AE) function, such as program AE, shutter priority AE, or aperture priority AE, designated by the shooting mode button.

The system controller 100 performs autofocus (AF) control as well as AE control. As the AF control, active autofocus, phase difference detection, and contrast detection are adoptable, for example. Examples of AF modes include a single central-point focusing mode using one focus area at the center, and a multipoint focusing mode using multiple focus areas. The system controller 100 drives and controls the focus motor 220 via the drive circuit 104 according to results of the autofocus, to adjust the focal point of the imaging lens 200.

The present embodiment adopts an all-lens-group protrusion, i.e., focusing by moving all the lens groups, with less variation in aberration among different focus positions. Another embodiment may, however, adopt focusing by moving part of the lens groups, such as front focusing, moving the front lens group of the imaging lens, or rear focusing, moving the rear lens group of the imaging lens. The features and control of such auto exposure and auto focus are known, so that detailed descriptions thereof are omitted.

With a light-blocking blade member of the shutter unit 210 opened, light beams from a subject are received on the light-receiving surface of the solid-state image sensor 106 through an aperture between the imaging lens 200 and the light-blocking blade member. With the light-blocking blade member completely closed, light beams from a subject are blocked by the light-blocking blade member from being received on the light-receiving surface of the solid-state image sensor 106.

The solid-state image sensor 106 represents a complementary metal oxide semi-conductor (CMOS) image sensor equipped with a Bayer array filter. The solid-state image sensor 106 accumulates optical images, formed through the imaging lens 200 on the pixels on the light-receiving surface, as charge corresponding to the light intensity. The solid-state image sensor 106 uses a floating diffusion amplifier to convert the accumulated charge into voltage (hereinafter, referred to as image signal). The image signal is outputted from the solid-state image sensor 106 to the signal processing circuit 108. The solid-state image sensor 106 may be alternatively a charge coupled device (CCD) image sensor or an image sensor incorporating a complementary filter.

The signal processing circuit 108 subjects the image signal from the solid-state image sensor 106 to certain signal processing, such as clamping or demosaicing. The signal processing circuit 108 then outputs the processed image signal to the image processing engine 110.

The image processing engine 110 subjects the image signal from the signal processing circuit 108 to certain signal processing, such as matrix operation, Y/C separation, and white balance, to generate a brightness signal Y and color difference signals Cb and Cr, and compress the signals in a given format such as joint photographic experts group (JPEG). The storage format of the image data is not limited to the JPEG format, but may be a RAW format subjected to minimum image processing such as black level correction, for example. The buffer memory 112 serves as transitory storage of data during the processing by the image processing engine 110.

The image processing engine 110 converts the brightness signal Y and the color difference signals Cb and Cr into a given video signal, and outputs the video signal to the LCD 114. The LCD 114 receives the video signal from the image processing engine 110 and controls modulation of liquid crystal in accordance with the video signal. As a result, the LCD 114 displays the image of the subject on the screen. The user can visually check, on the screen of the LCD 114, a real-time through-the-lens image (live viewing) generated at correct focal point with appropriate exposure under the AE control and the AF control.

A memory card (not illustrated) is removably inserted into a card slot of the card interface 120. The image processing engine 110 can communicate with the memory card via the card interface 120. The image processing engine 110 saves the generated image data in the memory card or the flash memory 118.

The user manipulates the shooting mode button to switch the shooting mode of the imaging device 1 between a normal shooting mode and a macro shooting mode. In the normal shooting mode, the shooting distance of the imaging device 1 i.e., the shooting distance of the lens barrel 20 is changeable within a first range of from 100 mm to infinity. In the macro shooting mode, the shooting distance of the imaging device 1 is changeable within a second range of from 60 mm to 120 mm shorter in minimum shooting distance than the first range.

In the present embodiment, the minimum shooting distance (100 mm) in the normal shooting mode is set to shorter than the maximum shooting distance (120 mm) in the macro shooting mode. Setting the shooting distances of the two shooting modes to partially overlap with each other enables the imaging device 1 to cover the entire shooting distance ranging from the minimum shooting distance (60 mm) in the macro shooting mode to the maximum shooting distance (infinity) in the normal shooting mode, irrespective of certain variations in the minimum shooting distance in the normal shooting mode and the maximum shooting distance in the macro shooting mode due to manufacturing error in the imaging device 1.

Figure 3:
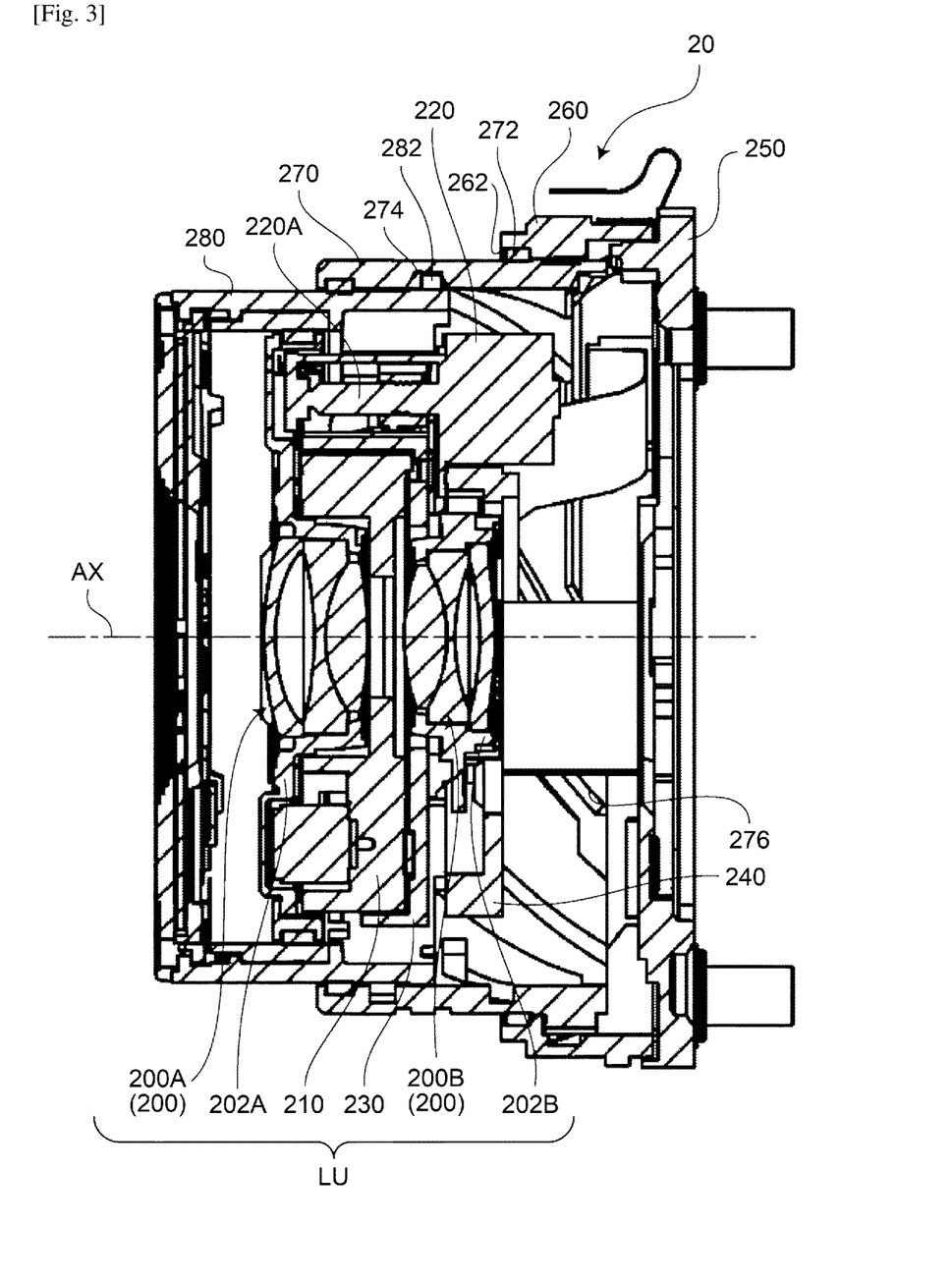
FIG. 3 is a cross-sectional view of a lens barrel along an optical axis AX in a normal shooting mode of the imaging device according to the embodiment, with the shooting distance set to infinity.

FIG. 3 is a cross-sectional view of the lens barrel 20 along the optical axis AX in the normal shooting mode of the imaging device 1, with the shooting distance set to infinity.

As illustrated in FIG. 3, the imaging lens 200 includes a first lens group 200A and a second lens group 200B. The first lens group 200A and the second lens group 200B are fixed to a first lens frame 202A and a second lens frame 202B, respectively. The shutter unit 210 is located between the first lens group 200A and the second lens group 200B.

The first lens frame 202A, the second lens frame 202B, and the shutter unit 210 are fixed to a focus frame 230. During manufacturing, the first lens frame 202A and the shutter unit 210 are fixed to the focus frame 230 first. The second lens frame 202B is then finely adjusted in position relative to the first lens frame 202A while the optical performance is measured with a jig, for example, and the second lens frame 202B is fixed to the focus frame 230 at the right position to exert given optical performance. Hereinafter, the united elements, i.e., the first lens group 200A, the first lens frame 202A, the second lens group 200B, the second lens frame 202B, the shutter unit 210, and the focus frame 230 will be referred to as a "lens frame unit LU" for the sake of explanation.

The lens barrel 20 includes a motor frame 240. The focus motor 220 is fixed to the motor frame 240.

The focus motor 220 is provided with a lead screw 220A. In response to a given driving control signal from the drive circuit 104 to the focus motor 220, the lead screw 220A rotates forward or reversely in accordance with the driving control signal.

Although not illustrated specifically, the lens frame unit LU (specifically, the focus frame 230) is supported by the lead screw 220A via a known mechanism such as a nut mechanism or a rack mechanism. Along with the forward rotation of the lead screw 220A, the lens frame unit LU moves forward to the object side along the optical axis AX inside the lens barrel 20. Along with the reverse rotation of the lead screw 220A, the lens frame unit LU moves backward to the image side along the optical axis AX inside the lens barrel 20.

The shooting distance of the imaging device 1 shortens as the lens frame unit LU moves forward further along the optical axis AX inside the lens barrel 20 by the rotation of the lead screw 220A. The shooting distance of the imaging device 1 lengthens as the lens frame unit LU moves backward along the optical axis AX inside the lens barrel 20 by the rotation of the lead screw 220A. That is, the focus motor 220 including the lead screw 220A serves as a driver to move at least part of the lens groups along the optical axis AX for focusing. The motor frame 240 serves as a holder to hold the focus motor 220 and the lens frame unit LU including the lens groups.

Figure 4:
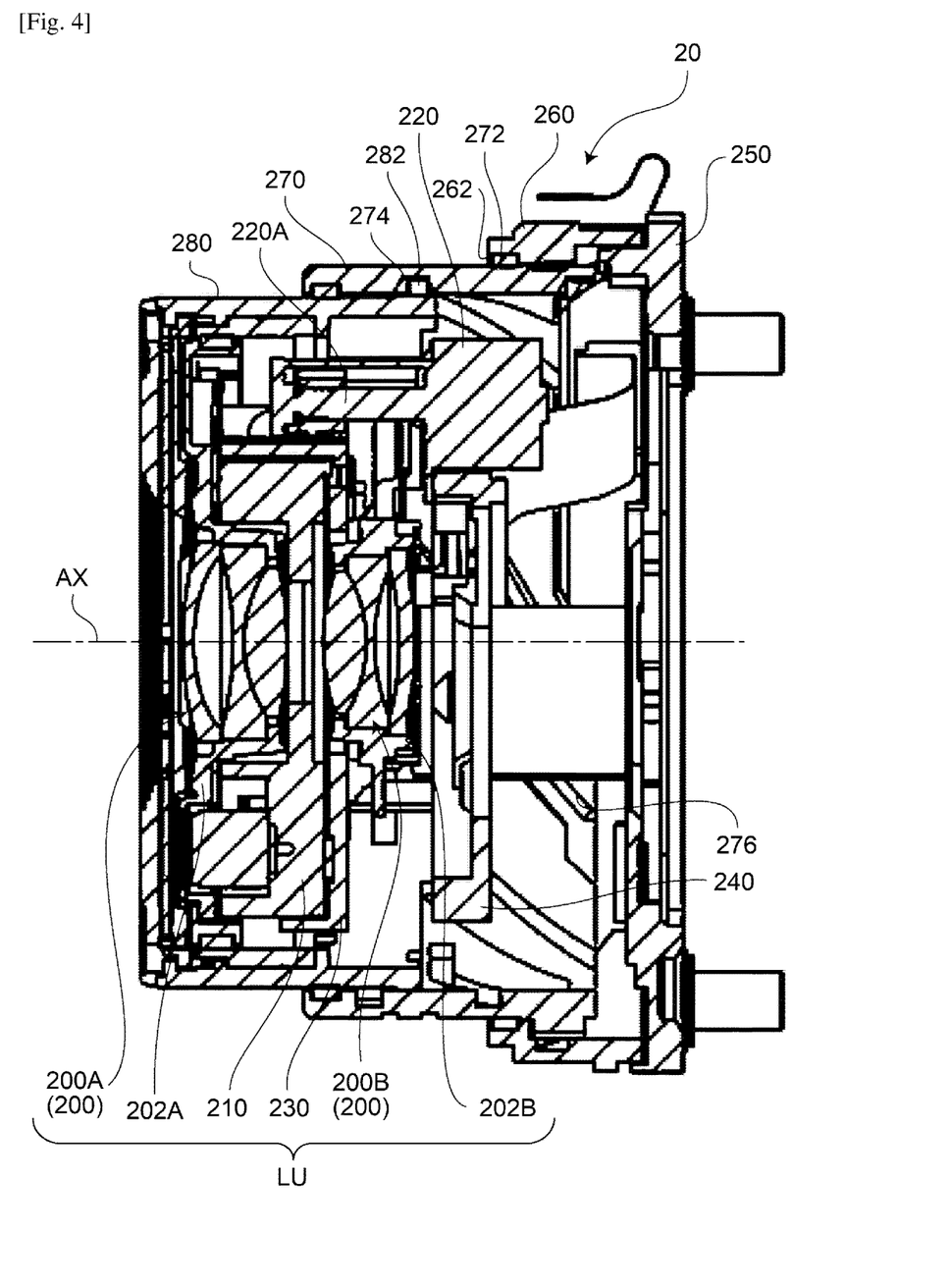
FIG. 4 is a cross-sectional view of the lens barrel along the optical axis AX in the normal shooting mode of the imaging device according to the embodiment, with the shooting distance set to a minimum.

When the lens frame unit LU moves forward from the position illustrated in FIG. 3 to the maximum along the optical axis AX inside the lens barrel 20, the shooting distance changes from infinity to the minimum (100 mm). FIG. 4 is a cross-sectional view of the lens barrel 20 along the optical axis AX in the minimum shooting distance (100 mm) in the normal shooting mode of the imaging device 1.

The lens barrel 20 includes a base 250 fixed to the device body 10. The lens barrel 20 further includes three cylindrical members, a fixed cylinder 260, a rotary cylinder 270, and a rectilinear cylinder 280.

The fixed cylinder 260 is fixed to the base 250.

The fixed cylinder 260 is provided with a cam groove 262 in the inner circumference. The rotary cylinder (cylindrical cam) 270 includes a follower 272 on the outer circumference, and the follower 272 is slidably attached to the cam groove 262.

The rotary cylinder 270 is provided with cam grooves 274 and 276 in the inner circumference. The rectilinear cylinder 280 includes a follower 282 on the outer circumference, and the follower 282 is slidably attached to the cam groove 274. A follower 242 (see FIGS. 5A and 5B) of the motor frame 240 is slidably attached to the cam groove 276.

According to the present embodiment, pairs of a cam groove and a follower (e.g., the cam groove 276 and the follower 242) are substantially even in three directions, for example.

The rotary cylinder 270 receives driving force of the lens barrel motor 122 in the device body 10 via a known transmission mechanism (not illustrated) such as a gear. Along with rotation of the rotary cylinder 270 about the optical axis AX by the driving force of the lens barrel motor 122, the rectilinear cylinder 280 moves relative to the rotary cylinder 270 along the optical axis AX. The rotary cylinder 270 also moves relative to the fixed cylinder 260 along the optical axis AX. The motor frame 240 as well as the lens frame unit LU and the focus motor 220 attached thereto move together along the optical axis AX inside the lens barrel 20.

Figure 5A:
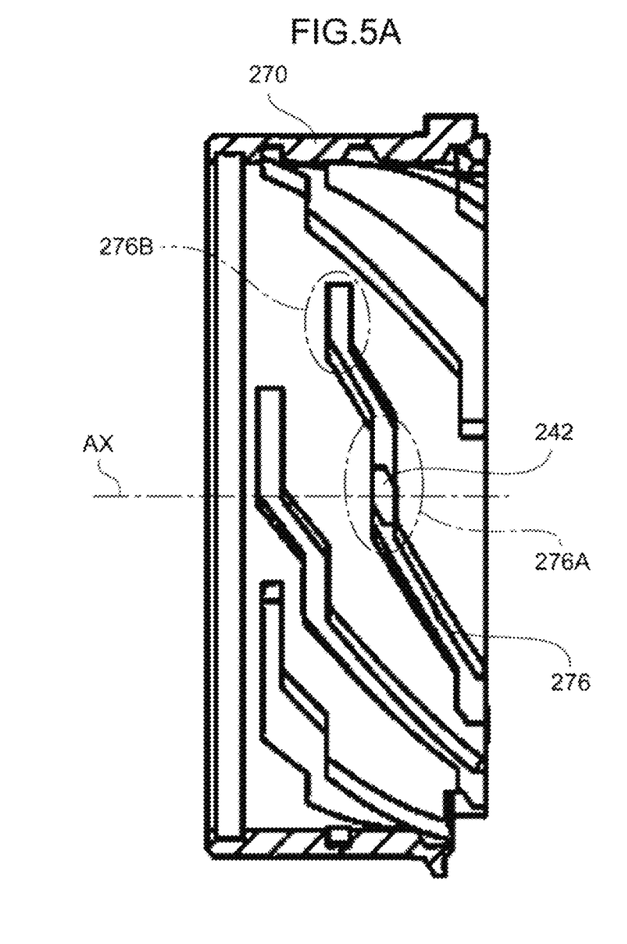
FIG. 5A is a cross-sectional view of a rotary cylinder along the optical axis AX depicting a relationship between a cam groove of the rotary cylinder of the lens barrel and a follower of a motor frame in the normal shooting mode.
Figure 5B:
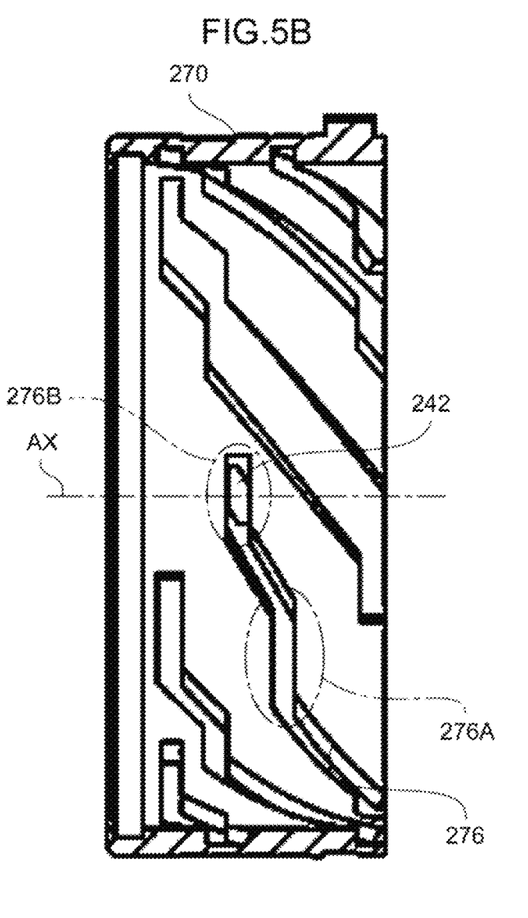
FIG. 5B is a cross-sectional view of the rotary cylinder along the optical axis AX depicting a relationship between the cam groove and the follower in a macro shooting mode.
Figure 6:
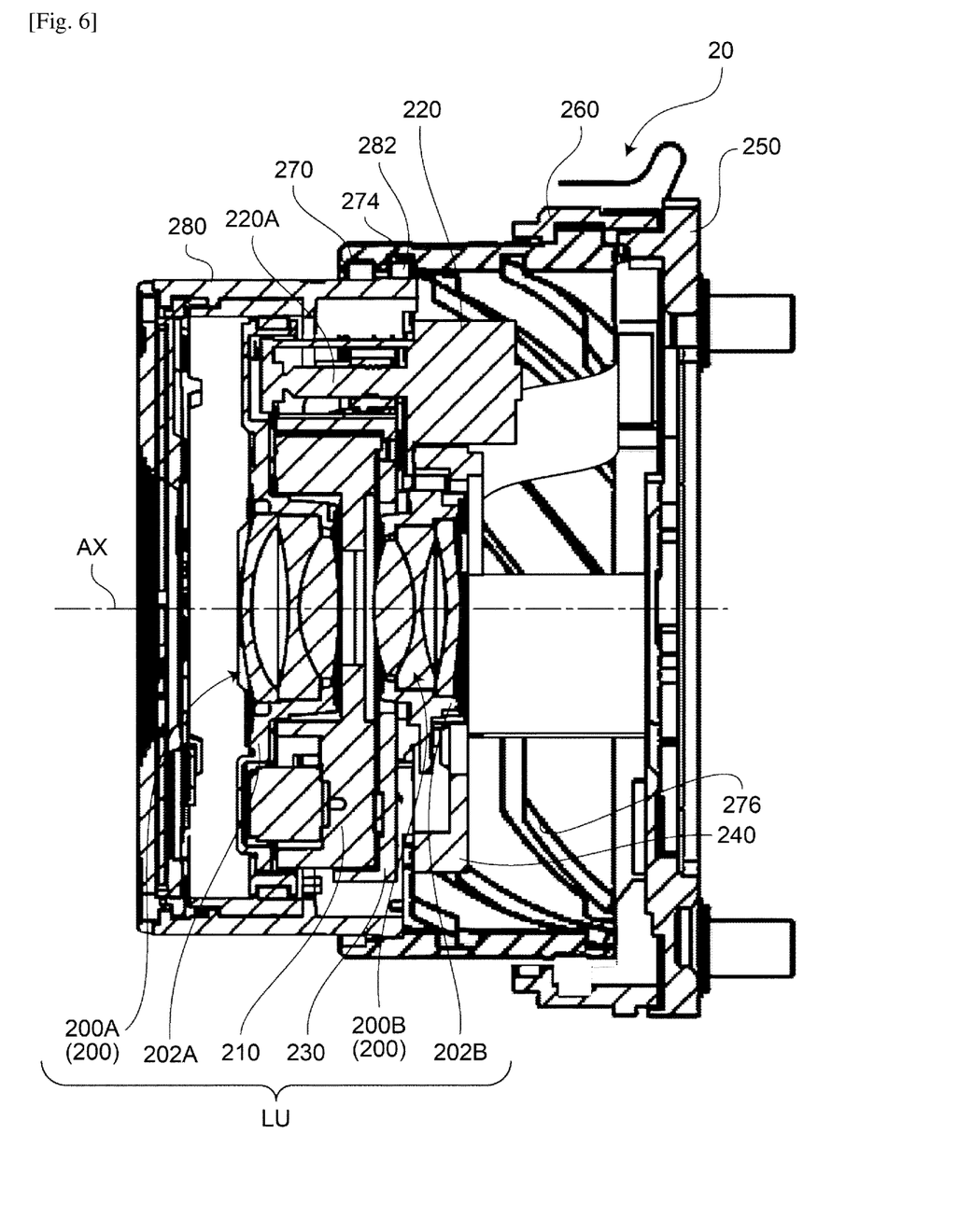
FIG. 6 is a cross-sectional view of the lens barrel along the optical axis AX in the macro shooting mode of the imaging device according to the embodiment, with the shooting distance set to a maximum.
Figure 7:
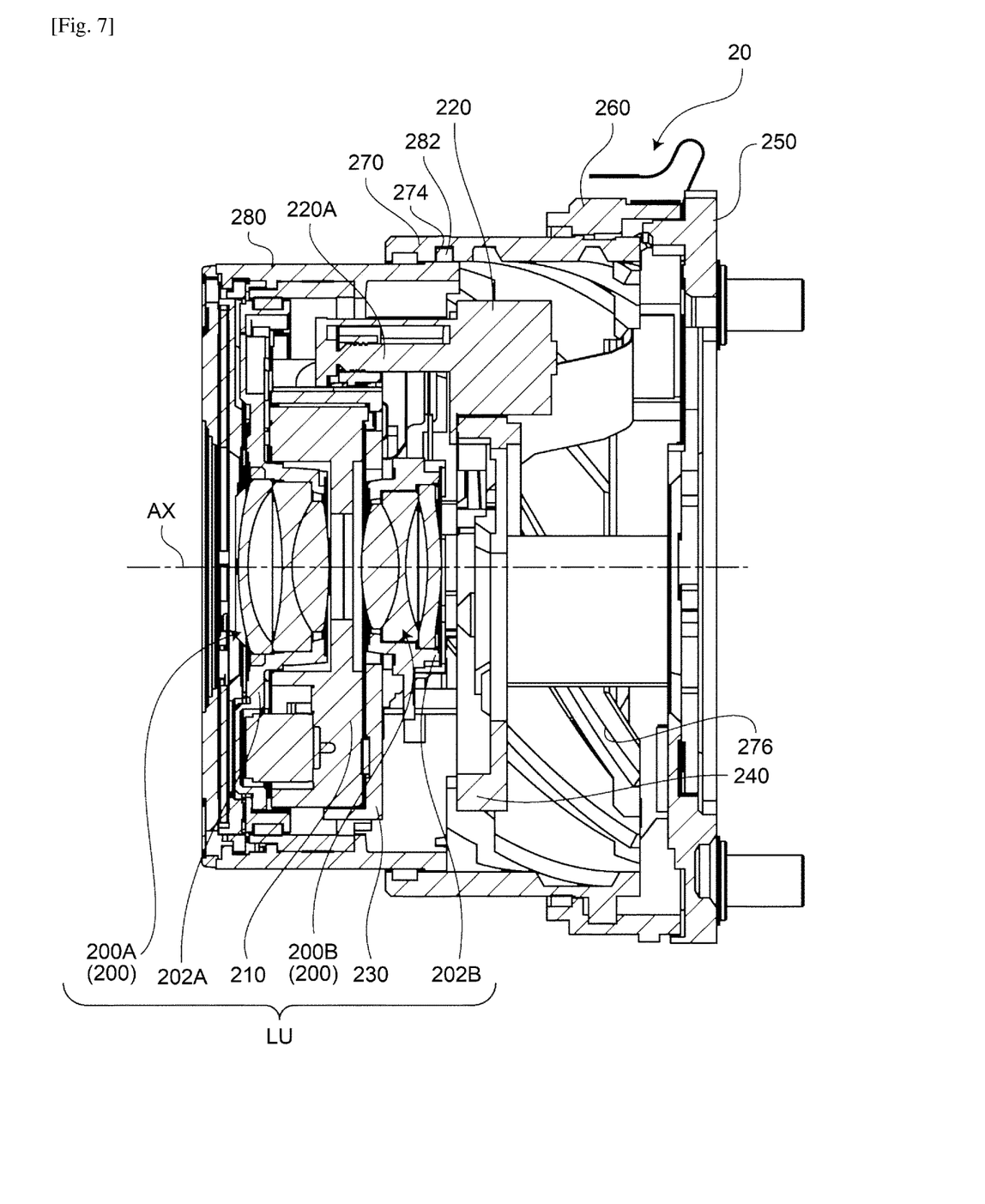
FIG. 7 is a cross-sectional view of the lens barrel along the optical axis AX) in the macro shooting mode of the imaging device according to the embodiment, with the shooting distance set to a minimum.

FIG. 5A is a cross-sectional view of the rotary cylinder 270 along the optical axis AX illustrating a relationship between the cam groove 276 of the rotary cylinder 270 and the follower 242 of the motor frame 240 in the normal shooting mode. FIG. 5B is a cross-sectional view of the rotary cylinder 270 along the optical axis AX illustrating a relationship between the cam groove 276 and the follower 242 in the macro shooting mode. FIG. 6 is a cross-sectional view of the lens barrel 20 along the optical axis AX) in the macro shooting mode of the imaging device 1 in the maximum shooting distance (120 mm). FIG. 7 is a cross-sectional view of the lens barrel 20 along the optical axis AX) in the macro shooting mode of the imaging device 1 in the minimum shooting distance (60 mm).

Figure 8:
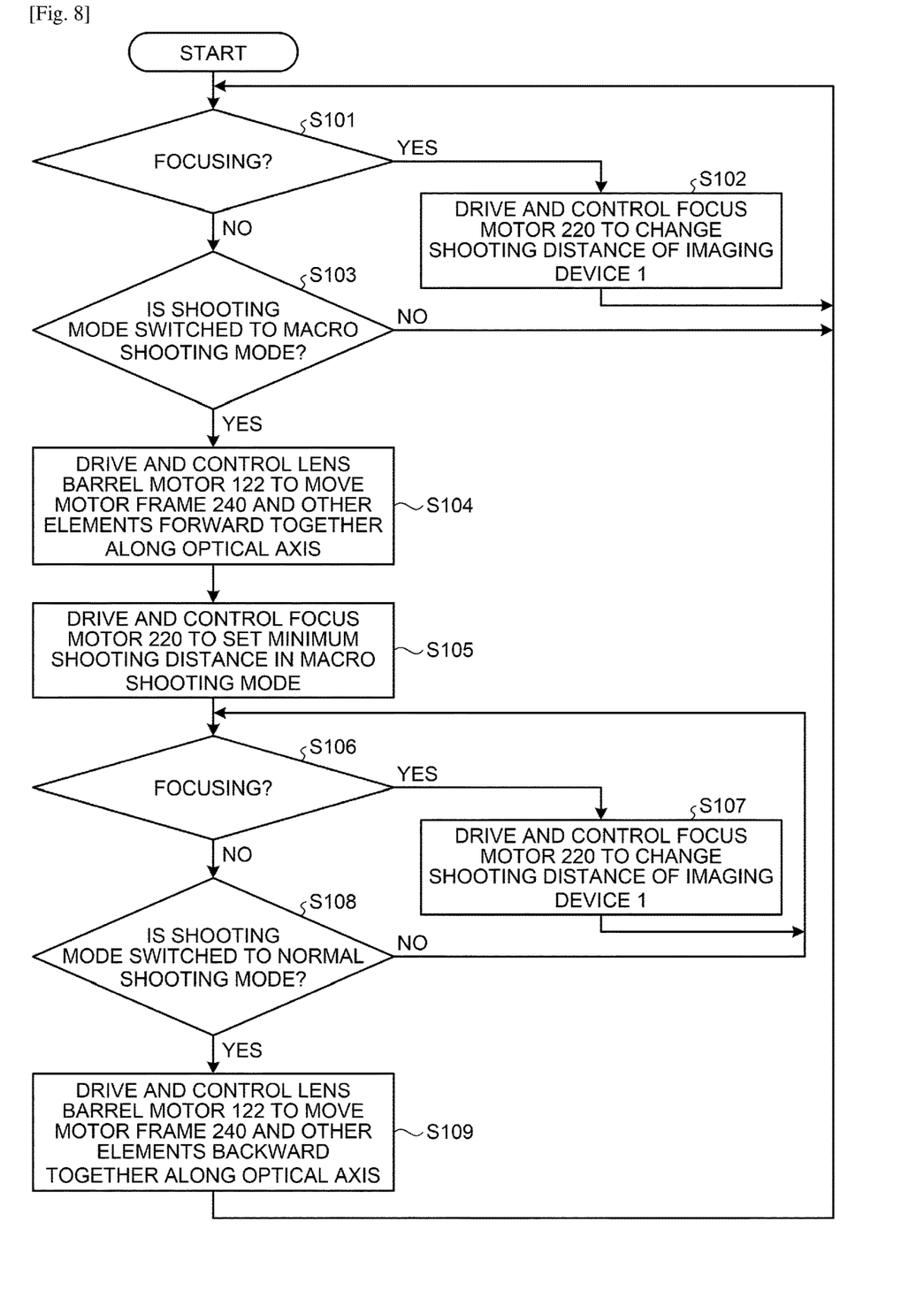
FIG. 8 is a flowchart illustrating operations of the imaging device according to the embodiment.

FIG. 8 is a flowchart illustrating the operations of the imaging device 1. The flowchart of FIG. 8 starts, for example, when the imaging device 1 is powered on, and ends when the imaging device 1 is powered off. At the time of power-on, the imaging device 1 is set to the normal shooting mode in the embodiment.

The system controller 100 determines whether the imaging device 1 is subjected to focusing for changing the shooting distance (step S101). After determining that the focusing is performed (YES in step S101), the system controller 100 drives and controls the focus motor 220 via the drive circuit 104 in accordance with the amount of focusing (step S102). This rotates the lead screw 220A of the focus motor 220 and moves the lens frame unit LU along the optical axis AX inside the lens barrel 20, to change the shooting distance of the imaging device 1 by a distance corresponding to the amount of focusing.

After determining that no focusing is performed (NO in step S101), the system controller 100 determines whether the shooting mode is switched from the normal shooting mode to the macro shooting mode (step S103). After determining that the shooting mode is switched (YES in step S103), the system controller 100 outputs a driving control signal to the lens barrel motor 122 to drive and control the lens barrel motor 122 (step S104). Applied with the driving force of the lens barrel motor 122, the rotary cylinder 270 rotates forward.

As illustrated in FIGS. 5A and 5B, the cam groove 276 of the rotary cylinder 270 includes a first groove 276A and a second groove 276B.

As illustrated in FIG. 5A, in the normal shooting mode the follower 242 of the motor frame 240 is located in the first groove 276A. The follower 242 slides in the cam groove 276 and reaches the second groove 276B along with the forward rotation of the rotary cylinder 270. As a result, the motor frame 240 as well as the focus motor 220 and the lens frame unit LU attached to the motor frame 240 move forward together relative to the rotary cylinder 270 along the optical axis AX, that is, these elements all protrude together toward the subject. Also, the follower 282 slides in the cam groove 274 along with the rotation of the rotary cylinder 270, thereby causing the rectilinear cylinder 280 to protrude toward the subject relative to the rotary cylinder 270.

Consequently, the lens barrel 20 transitions from the state of FIG. 3 (in the normal shooting mode in the shooting distance of infinity) to the state of FIG. 6 (in the macro shooting mode in the maximum shooting distance (120 mm). That is, the rotary cylinder 270 serves as a mover to move the focus motor 220 and the lens frame unit LU including the lens groups together along the optical axis AX by moving the motor frame 240 along the optical axis AX with the driving force from a given driver. The rotary cylinder 270 can move the motor frame 240 to at least a first position, at which the shooting distance of the imaging device 1 is changeable within the first range, and a second position, at which the shooting distance of the imaging device 1 is changeable within the second range shorter in minimum shooting distance than the first range.

The first groove 276A and the second groove 276B both have a shape extending in a direction orthogonal to the optical axis AX. Thus, irrespective of error in the angle of rotation of the rotary cylinder 270, the follower 242 remains unchanged in position in the Z-axis direction inside the first groove 276A or the second groove 276B. That is, the motor frame 240 including the follower 242 as well as the focus motor 220 and the lens frame unit LU attached to the motor frame 240 stop at appropriate positions in the respective shooting modes (the Z-axial positions defined by the first groove 276A or the second groove 276B), irrespective of error in the angle of rotation of the rotary cylinder 270.

The system controller 100 drives and controls the focus motor 220 via the drive circuit 104 (step S105). Thereby, the lead screw 220A of the focus motor 220 rotates forward, and the lens frame unit LU moves forward along the optical axis AX inside the lens barrel 20 until reaching the minimum shooting distance (60 mm).

The lens barrel 20 transitions from the state of FIG. 6 (in the macro shooting mode in the maximum shooting distance (120 mm)) to the state of FIG. 7 (in the macro shooting mode in the minimum shooting distance (60 mm)). By setting the shooting distance to a minimum in the macro shooting mode at the time of switching to the macro shooting mode, the user can check how closely the subject can be captured in the macro shooting mode.

The system controller 100 determines whether the imaging device 1 is subjected to focusing to change the shooting distance (step S106). After determining that focusing is performed (YES in step S106), the system controller 100 drives and controls the focus motor 220 via the drive circuit 104 in accordance with the amount of focusing (step S107). This rotates the lead screw 220A of the focus motor 220 and moves the lens frame unit LU along the optical axis AX inside the lens barrel 20, to change the shooting distance of the imaging device 1 by a distance corresponding to the amount of focusing.

After determining that no focusing is performed (NO in step S106), the system controller 100 determines whether the shooting mode is switched from the macro shooting mode to the normal shooting mode (step S108). After determining that the shooting mode is switched (YES in step S108), the system controller 100 outputs a driving control signal to the lens barrel motor 122 to drive and control the lens barrel motor 122 (step S109). Applied with the driving force of the lens barrel motor 122, the rotary cylinder 270 rotates reversely. The follower 242 slides in the cam groove 276 and reach the first groove 276A along with the reverse rotation of the rotary cylinder 270. Thereby, the motor frame 240 as well as the focus motor 220 and the lens frame unit LU attached to the motor frame 240 move backward together along the optical axis AX relative to the rotary cylinder 270 inside the lens barrel 20. Also, the follower 282 slides in the cam groove 274 along with the rotation of the rotary cylinder 270, thereby moving the rectilinear cylinder 280 closer to the rotary cylinder 270. Thus, the lens barrel 20 transitions from the state of FIG. 7 or 8 (the macro shooting mode) to the state of FIG. 3 or 4 (the normal shooting mode).

Figure 9:
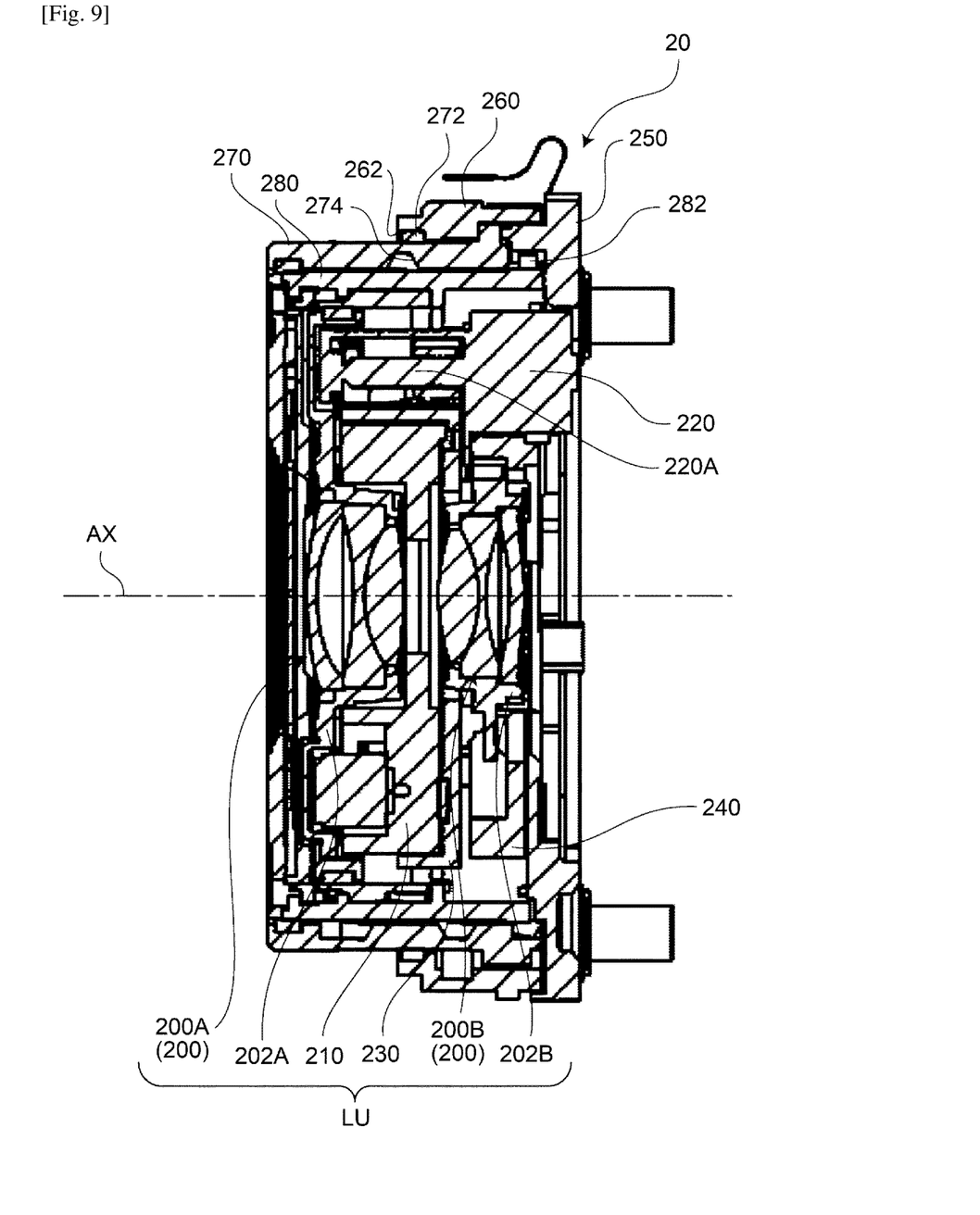
FIG. 9 is a cross-sectional view of the lens barrel in a retracted state according to the embodiment.

In response to power-off of the imaging device 1 or a given operation during the processing following the flowchart of FIG. 8, the lens barrel 20 is retracted into the device body 10. FIG. 9 is a cross-sectional view of the lens barrel 20 along the optical axis AX after retracted, i.e., in a retracted state.

During retraction, the system controller 100 causes the focus motor 220 to move the lens frame unit LU inside the lens barrel 20 until reaching the maximum shooting distance in the current shooting mode. The system controller 100 reversely rotates the rotary cylinder 270 beyond the position in the normal shooting mode. As a result, the follower 272 slides along the cam groove 262, and thus the rotary cylinder 270 moves relative to the fixed cylinder 260 along the optical axis AX closer to the image side. Also, the follower 282 slides along the cam groove 274, and thus the rectilinear cylinder 280 moves closer to the image side relative to the rotary cylinder 270 along the optical axis AX.

In the retracted state, as illustrated in FIG. 9, the motor frame 240 as well as the focus motor 220 and the lens frame unit LU attached to the motor frame 240 are closer to the image side than in the normal shooting mode or in the macro shooting mode. Thus, the rotary cylinder 270 and the rectilinear cylinder 280 are collapsible to a larger extent in the retracted state, shortening the total length of the lens barrel 20.

As described above, in the present embodiment the lens frame unit LU including the lens groups and the focus motor 220 serving as a driver move together to the positions corresponding to the shooting mode after switching. That is, the positions of the lens groups can be controlled in the same manner in any shooting mode, e.g., the interval or relative position between the lens groups can be maintained same as in the normal shooting mode. Thus, the optical performance of the imaging lens 200 can be maintained in the macro shooting mode same as in the normal shooting mode. This further enables the user to readily switch between the shooting modes without attaching a macro conversion lens or an extension tube, for example.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

REFERENCE SIGNS LIST

1 Imaging device
10 Device body
20 Lens barrel
100 System controller
102 Operation unit
104 Drive Circuit
106 Solid-state image sensor
108 Signal processing circuit
110 Image processing engine
112 Buffer memory
114 LCD
116 ROM
118 Flash memory
120 Card interface
122 Lens barrel motor
200 Imaging lens
200A First lens group
200B Second lens group
202A First lens frame
202B Second lens frame
210 Shutter unit
220 Focus motor
220A Lead screw
230 Focus frame
240 Motor frame
242 Follower
250 Base
260 Fixed cylinder
262 Cam groove
270 Rotary cylinder
272 Follower
274, 276 Cam groove
276A First groove
276B Second groove
280 Rectilinear cylinder
282 Follower
LU Lens frame unit

The invention claimed is:

1. A lens barrel comprising:
a plurality of lens groups;
a driver configured to move at least part of the plurality of lens groups along an optical axis for focusing;
a holder configured to hold the plurality of lens groups and the driver; and
a mover configured to move the plurality of lens groups and the driver together along the optical axis by moving the holder along the optical axis, wherein:
the mover moves the holder to at least a first position and a second position, the first position at which a shooting distance of the lens barrel is changeable within a first range, the second position at which the shooting distance of the lens barrel is changeable within a second range,
the second range is shorter in minimum shooting distance than the first range,
the mover comprises a cylindrical cam including a cam part,
the holder comprises a follower slidable along the cam part,
the cam part is a cam groove in the cylindrical cam,
the cam groove includes:
a first groove in which the follower is located when the holder is at the first position, and
a second groove in which the follower is located when the holder is at the second position, and
the first groove and the second groove each have a shape extending in a direction orthogonal to the optical axis.

2. The lens barrel according to claim 1, wherein the minimum shooting distance in the first range is shorter than a maximum shooting distance in the second range.

3. The lens barrel according to claim 1 wherein the holder moves along the optical axis as the follower slides along the cam part by rotation of the cylindrical cam about the optical axis.

4. The lens barrel according to claim 1, wherein the mover moves the holder to a third position that is closer to an image side than the first position and the second position.

5. The lens barrel according to claim 1, wherein in response to motion of the holder from the first position to the second position, the driver moves at least part of the plurality of lens groups along the optical axis to set the lens barrel at the minimum shooting distance in the second range.

6. An imaging device comprising:
a device body; and
the lens barrel according to claim 1.

7. The imaging device according to claim 6, wherein the second groove extends from the first groove.

8. The imaging device according to claim 6, wherein the minimum shooting distance in the first range is shorter than a maximum shooting distance in the second range.

9. The imaging device according to claim 6, wherein the holder moves along the optical axis as the follower slides along the cam groove by rotation of the cylindrical cam about the optical axis.

10. The imaging device according to claim 6, wherein in response to motion of the holder from the first position to the second position, the driver moves at least part of the plurality of lens groups along the optical axis to set the lens barrel at the minimum shooting distance in the second range.

11. The imaging device according to claim 6, wherein the mover is in the form of a rotary cylinder.

12. The imaging device according to claim 11, wherein the cam groove is disposed in an inner circumference of the rotary cylinder.

13. The imaging device according to claim 6, further comprising:
a shutter; and
a focus motor,
wherein the focus motor is controlled to adjust a focal point of the plurality of lens groups.

14. The imaging device according to claim 13, wherein:
the focus motor includes a lead screw, and
the focus motor is configured to rotate forwards or reverse in accordance with a driving control signal.

15. The imaging device according to claim 6, wherein:
the plurality of lens groups includes a first lens group and a second lens group, and
the shutter is fixed is located between the first lens group and the second lens group.

16. The lens barrel according to claim 1, wherein the second groove extends from the first groove.

17. The lens barrel according to claim 1, wherein the mover is in the form of a rotary cylinder, and
wherein the cam groove is disposed in an inner circumference of the rotary cylinder.

18. The lens barrel according to claim 1, further comprising:
a shutter; and
a focus motor,
wherein the focus motor is controlled to adjust a focal point of the plurality of lens groups.

19. The lens barrel according to claim 1, wherein:
the focus motor includes a lead screw, and
the focus motor is configured to rotate forwards or reverse in accordance with a driving control signal.

20. The lens barrel according to claim 1, wherein:
the plurality of lens groups includes a first lens group and a second lens group, and
the shutter is fixed is located between the first lens group and the second lens group.

* * * * *